United States Patent
Xie et al.

(10) Patent No.: US 11,319,057 B2
(45) Date of Patent: May 3, 2022

(54) ELECTRIC PEDAL CONTROL DEVICE FOR AIRCRAFT

(71) Applicants: COMMERCIAL AIRCRAFT CORPORATION OF CHINA, LTD., Shanghai (CN); COMMERCIAL AIRCRAFT CORPORATION OF CHINA, LTD. SHANGHAI AIRCRAFT DESIGN AND RESEARCH INSTITUTE, Shanghai (CN)

(72) Inventors: Dianhuang Xie, Shanghai (CN); Zhengqiang Li, Shanghai (CN); Yefei Dai, Shanghai (CN); Jian Li, Shanghai (CN); Junhui Liao, Shanghai (CN); Desheng Xu, Shanghai (CN); Shenghui Yu, Shanghai (CN)

(73) Assignees: COMMERCIAL AIRCRAFT CORPORATION OF CHINA, LTD., Shanghai (CN); COMMERCIAL AIRCRAFT CORPORATION OF CHINA, LTD. SHANGHAI AIRCRAFT DESIGN AND RESEARCH INSTITUTE, Shanghai (CN)

( * ) Notice: Subject to any disclaimer, the term of this patent is extended or adjusted under 35 U.S.C. 154(b) by 543 days.

(21) Appl. No.: 16/310,058
(22) PCT Filed: Nov. 30, 2017
(86) PCT No.: PCT/CN2017/113849
§ 371 (c)(1),
(2) Date: Dec. 14, 2018
(87) PCT Pub. No.: WO2018/184396
PCT Pub. Date: Oct. 11, 2018

(65) Prior Publication Data
US 2019/0382101 A1    Dec. 19, 2019

(30) Foreign Application Priority Data
Apr. 6, 2017 (CN) .......................... 201710222234.4

(51) Int. Cl.
*B64C 13/04* (2006.01)
*B64C 13/12* (2006.01)
*B64C 13/30* (2006.01)

(52) U.S. Cl.
CPC ............ *B64C 13/044* (2018.01); *B64C 13/12* (2013.01); *B64C 13/30* (2013.01)

(58) Field of Classification Search
CPC ....... B64C 13/044; B64C 13/12; B64C 13/30; B64C 13/503
See application file for complete search history.

(56) References Cited

U.S. PATENT DOCUMENTS

| | | | | |
|---|---|---|---|---|
| 3,576,302 A | * | 4/1971 | Palfreyman | ........... B64C 13/044 244/236 |
| 3,999,726 A | | 12/1976 | Carlson et al. | |

(Continued)

FOREIGN PATENT DOCUMENTS

| | | |
|---|---|---|
| CN | 103057697 A | 4/2013 |
| CN | 103587679 A | 2/2014 |

(Continued)

OTHER PUBLICATIONS

Search Report dated Apr. 1, 2020 in European Application No. 17904754.3, 9 pages.

(Continued)

*Primary Examiner* — Rodney A Bonnette
(74) *Attorney, Agent, or Firm* — Maier & Maier, PLLC

(57) ABSTRACT

An electric pedal control device for an aircraft, the device comprising several pedal transmission assemblies, each of the pedal transmission assemblies comprising an electric motor, an elastic connector, a transmission mechanism, an angular displacement sensor, and a pedal, wherein the angular displacement sensor is configured to acquire rotational position information about the pedal; transmission mecha- (Continued)

nism revolute pairs of the transmission mechanisms in the pedal transmission assemblies are connected via a mechanical connecting rod mechanism to effect linkage; and a controller of the electric pedal control device is configured to receive the rotational position information, and to control, according to the rotational position information, the electric motors to dampen the elastic connectors.

8 Claims, 2 Drawing Sheets

(56) References Cited

U.S. PATENT DOCUMENTS

| | | | | |
|---|---|---|---|---|
| 5,806,806 | A * | 9/1998 | Boehringer | B64C 13/505 244/196 |
| 2011/0108673 | A1 | 5/2011 | Antraygue | |
| 2011/0108674 | A1 | 5/2011 | Gardner | |
| 2014/0077025 | A1 * | 3/2014 | Yates | B64D 43/00 244/17.13 |
| 2016/0159457 | A1 * | 6/2016 | Saint-Marc | B64C 13/044 244/235 |
| 2017/0106971 | A1 * | 4/2017 | Wilkens | B64C 13/503 |

FOREIGN PATENT DOCUMENTS

| | | |
|---|---|---|
| DE | 3825809 A1 | 2/1990 |
| EP | 0743581 A1 | 11/1996 |
| WO | 2014106428 A1 | 7/2014 |

OTHER PUBLICATIONS

International Search Report with English translation and Written Opinion dated Feb. 28, 2018 in corresponding International Application No. PCT/CN2017/113849; 9 pages.

* cited by examiner

ELECTRIC PEDAL CONTROL DEVICE FOR AIRCRAFT

FIELD

The invention relates to the field of aviation, and in particular to an electric pedal control device for an aircraft.

BACKGROUND

A pedal control device is one of the important interfaces for a man-machine interface of an aircraft cockpit, is the core component of a fly-by-wire flight control system, mainly provides a manoeuvring signal for a rudder, and realizes a manual balancing function, a follow-up function (following up an autopilot), and an override pedal (disconnecting the autopilot).

The traditional pedal control devices of large-scale civil aircrafts are mainly divided into two categories: a distributed pedal control device and a centralized pedal control device. The distributed pedal control device mainly uses discrete components and a distributed layout form, and the Boeing series aircraft uses this type of layout form. The centralized pedal control device mainly integrates discrete components and uses a centralized layout form, and the Airbus series aircraft uses this type of layout form. The centralized pedal control device is a further structural layout optimization of the distributed pedal drive device, but in fact, they share the same drive mode, and both have a series of defects such as having a complicated design and a complicated transmission mechanism, being difficult to assemble, having high manufacturing costs and high maintenance costs, and the transmission mechanism being easily jammed due to a single point of failure.

As a result, the existing conventional pedal control devices are difficult to meet the increasing requirements of development of the flight control system, namely, reducing the weight, reducing the maintenance cost, and increasing the dispatch rate.

SUMMARY

The technical problem to be solved by the present invention is to propose an electric pedal control device for an aircraft, in order overcome the defects of the conventional pedal control devices in the prior art that the structure of the transmission mechanism is complicated, the assembly is difficult, the cost is high, and the single point of failure easily causes a jamming failure of the transmission mechanism.

The above-mentioned technical problem is solved in the present invention by the following technical solutions:

the present invention provides an electric pedal control device for an aircraft, comprising several pedal transmission assemblies, each of the pedal transmission assemblies comprising an electric motor, an elastic connector, a transmission mechanism, an angular displacement sensor, and a pedal, wherein the elastic connector connects an output shaft of the electric motor and one end of the transmission mechanism, the other end of the transmission mechanism is connected to the pedal via a pedal revolute pair, the angular displacement sensor is configured to acquire rotational position information about the pedal around the pedal revolute pair, and the transmission mechanism is provided with a transmission mechanism revolute pair; the transmission mechanism revolute pairs of the transmission mechanisms in the pedal transmission assemblies are connected via a mechanical connecting rod mechanism to effect linkage; and the electric pedal control device further comprises a controller, which is configured to receive the rotational position information acquired by the angular displacement sensors, and to control, according to the rotational position information, the electric motors to dampen the elastic connectors.

Preferably, the angular displacement sensor uses a RVDT (i.e., Rotary Variable Differential Transformer) sensor.

Preferably, the controller is further configured to receive an input control instruction, and to directly control the operation of the electric motors according to the control instruction.

Preferably, the control instruction comprises a manual balancing instruction, and the controller is configured to directly control all of or some of the electric motors to balance elastic forces of the elastic connectors according to the manual balancing instruction.

Preferably, when the rotational position information received by the controller indicates that the rotational acceleration of at least one of the pedals around the pedal revolute pair exceeds a pre-set rotational acceleration threshold, the controller rejects to directly control the operation of the electric motors according to the input control instruction.

Preferably, the output shaft of the electric motor is connected to the elastic connector via a torque limiter.

Preferably, the elastic connector is a spring.

Preferably, the electric pedal control device further comprises an output interface, which is configured to transmit the rotational position information to a flight control computer of the aircraft.

Preferably, the several pedal transmission assemblies comprise two left pedal transmission assemblies and two right pedal transmission assemblies, the two left pedal transmission assemblies and the two right pedal transmission assemblies share a transmission mechanism revolute pair, and the transmission mechanism revolute pair shared by the two left pedal transmission assemblies and the transmission mechanism revolute pair shared by the two right pedal transmission assemblies are connected via a mechanical connecting rod mechanism to effect linkage.

Preferably, in each of the pedal transmission assemblies, one end of the elastic connector is connected to the output shaft of the electric motor and the other end thereof is connected to the corresponding transmission mechanism revolute pair via a connecting rod, and the corresponding transmission mechanism revolute pair is connected to the pedal via a transmission component and the pedal revolute pair.

On the basis of compliance with the common general knowledge in the art, the above various preferred conditions can be arbitrarily combined to obtain the various preferred embodiments of the present invention.

The positive and progressive effects of the present invention lie in that:

the electric pedal control device for an aircraft of the present invention can simplify the transmission mechanism while reducing the volume, is easy to maintain, has high reconfigurability, and prevents the occurrence of a jamming failure of the transmission mechanism due to a single point of failure, thereby helping to increase the dispatch rate.

DETAILED DESCRIPTION

Figure 1:
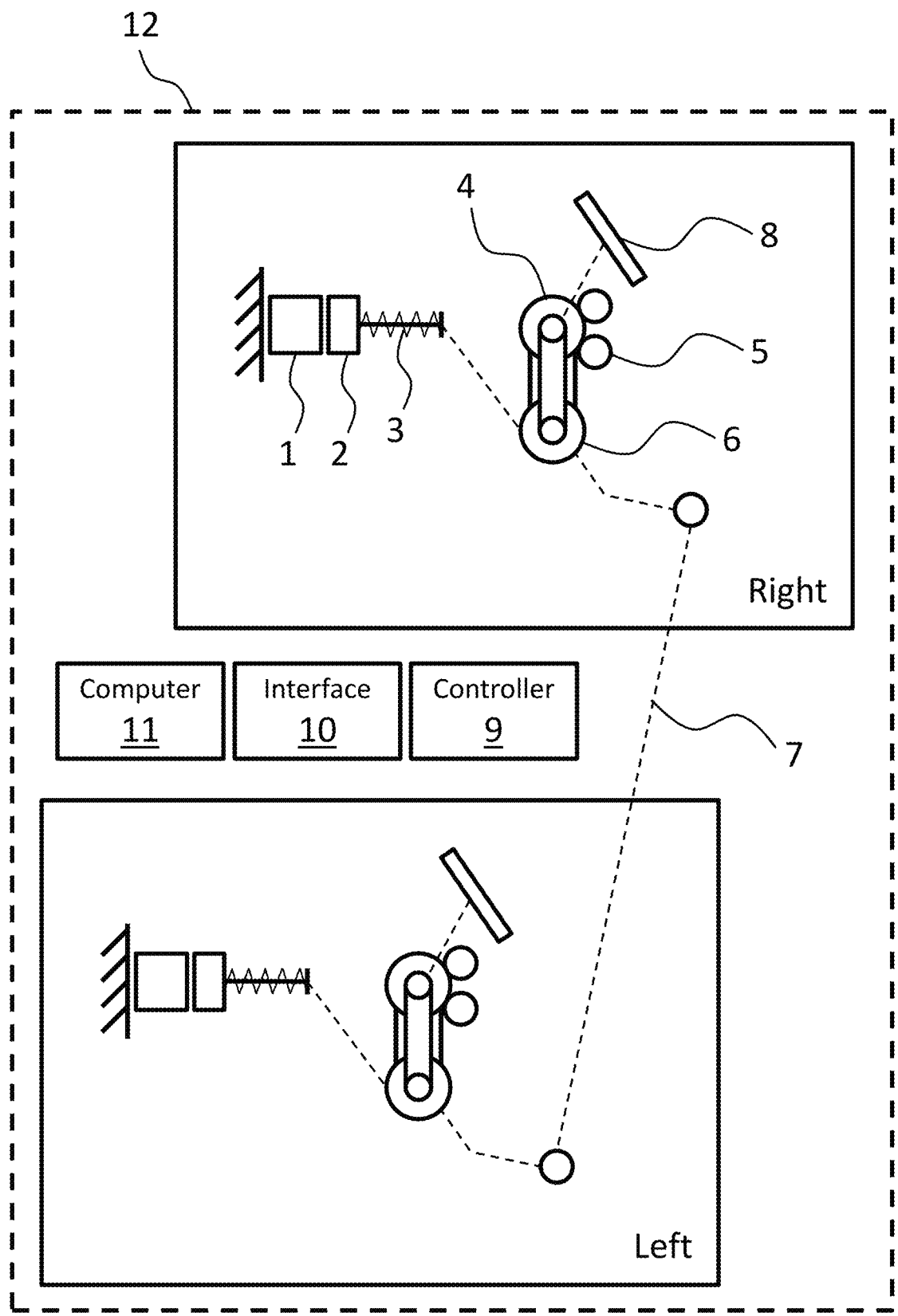
FIG. 1 is a schematic diagram of an electric pedal control device of a preferred embodiment of the present invention.

The preferred embodiments of the present invention are described in detail below with reference to the accompanying drawings, and the following description is illustrative, but not limiting the present invention, and any other similar circumstances also fall within the scope of the present invention.

In the following detailed description, directional terms such as "left", "right", "upper", "lower", "front", "rear", etc. are used with reference to the directions described in the drawings. The components in the embodiments of the present invention may be placed in a variety of different orientations, and the directional terms are used for purposes of example and not limitation.

Figure 2:
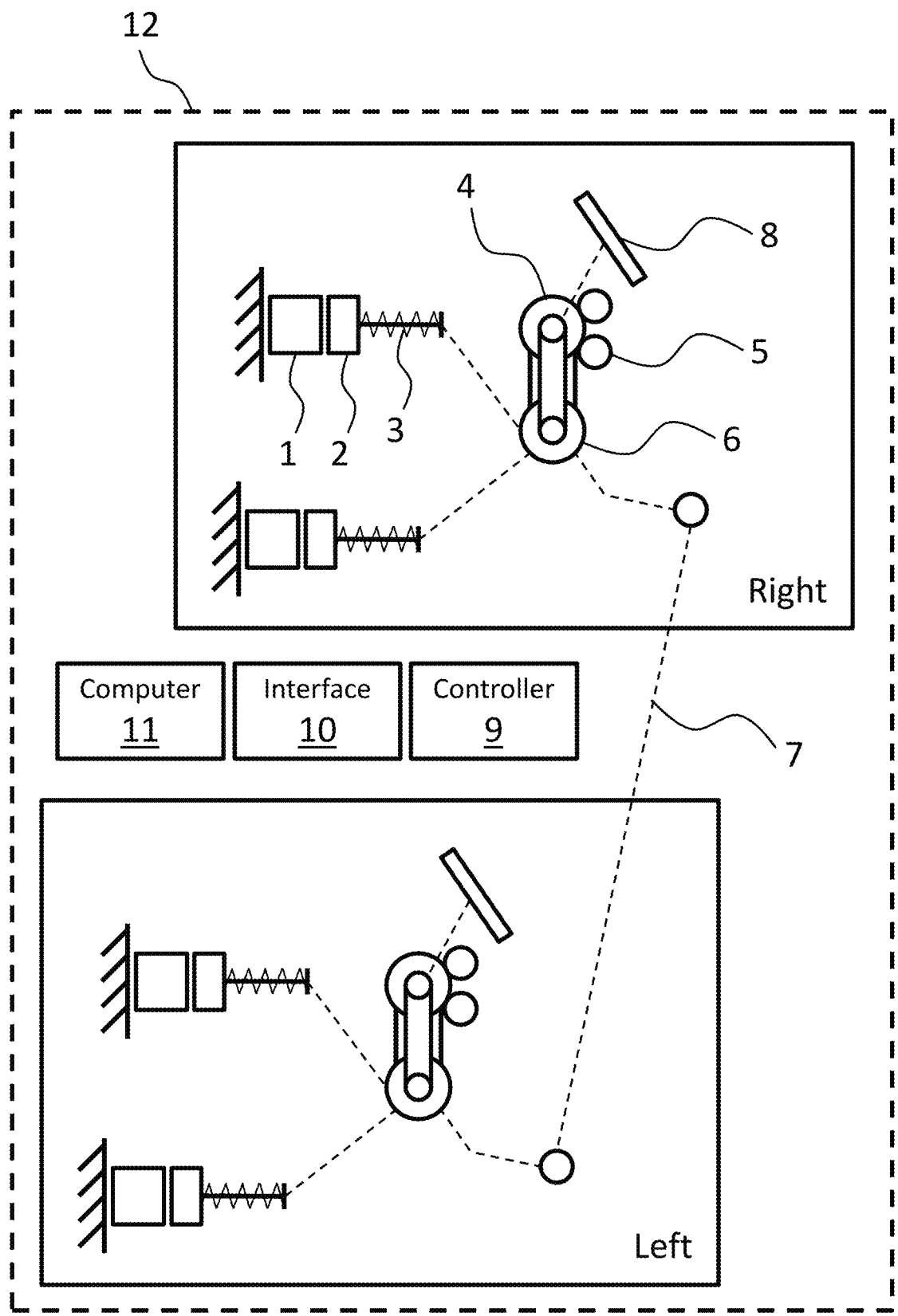
FIG. 2 is a schematic diagram of an electric pedal control device of another preferred embodiment of the present invention.

Referring to FIG. 2, an electric pedal control device for an aircraft according to a preferred embodiment of the present invention may have four pedal transmission assemblies, so as to form a quad-redundant electric pedal control device. However, an electric pedal control device of another preferred embodiment of the present invention may also use another number of pedal transmission assemblies.

Referring to FIG. 1, a left pedal transmission assembly is in the lower box, and a right pedal transmission assembly is in the upper box. Each of the pedal transmission assemblies comprises an electric motor 1, an elastic connector 3, a transmission mechanism, an angular displacement sensor 5, and a corresponding pedal 8, wherein the elastic connector 3 connects an output shaft of the electric motor 1 and one end of the transmission mechanism via a torque limiter 2. The other end of the transmission mechanism is connected to the pedal 8 via a pedal revolute pair 4, and the angular displacement sensor 5 is configured to acquire rotational position information about the pedal 8 around the pedal revolute pair 4. The electric pedal control device further comprises a controller 9, and the controller is configured to receive the rotational position information acquired by the angular displacement sensor 5, and to control, according to the rotational position information, the electric motor 1 to dampen the elastic connector 3. The transmission mechanism has a transmission mechanism revolute pair 6, and the transmission mechanism revolute pairs 6 of the pedal transmission assemblies are connected via a mechanical connecting rod mechanism 7 to effect linkage.

According to one respect of the present invention, for an aircraft with a pedal control device in a hot backup mode, when encountering a typical single point of failure, such as when a certain elastic connector 3 fails and is disconnected, there is only need to cut off the output of the corresponding electric motor, and recalculate the output of the remaining three electric motors or two electric motors or another number of electric motors with appropriate reconstruction algorithms, then the remaining electric motors can be used to achieve control of force balance.

It should be understood that, the connection and transmission relationship from the pedal to the electric motor and the linkage relationship between the multiple pedal transmission assemblies in the electric pedal control device for the aircraft according to a preferred embodiment of the present invention are schematically shown in FIG. 1, however, the present invention is not necessarily limited to the implementation of the structure shown in FIG. 1.

According to one preferred embodiment of the present invention as depicted in FIG. 2, optionally, the two left pedal transmission assemblies and the two right pedal transmission assemblies may each share a transmission mechanism revolute pair 6, and the transmission mechanism revolute pair 6 shared by the two left pedal transmission assemblies and the transmission mechanism revolute pair 6 shared by the two right pedal transmission assemblies are connected via a mechanical connecting rod mechanism 7 to effect linkage.

According to another aspect of the present invention, the angular displacement sensors 5 in a quad-redundant electric pedal control device may use RVDT sensors, each RVDT sensor corresponding to a pedal, and the electric motor assembly may include an electric micromotor and a photoelectric coded disk. The elastic connector 3 may use a spring. A force sense is generated by the spring, and the controller acquires a signal obtained by the RVDT sensor indicating the movement of the pedal position to control the electric motors to generate a dampening function, so that the electric motors and the spring are used to effect the dampening and force sense functions of the pedal control device.

According to some preferred embodiments of the present invention, the electric pedal control device of the present invention may further comprise an output interface 10, the output interface 10 being configured to transmit the rotational position information to a flight control computer 11 of the aircraft 12.

According to some preferred embodiments of the present invention, the controller is further configured to receive an input control instruction, and to directly control the operation of the electric motors according to the control instruction.

The control instruction may comprise a manual balancing instruction, and the controller is configured to directly control all of or some of the electric motors to balance the elastic forces of the elastic connectors according to the manual balancing instruction.

Therefore, only by operating a balancing switch, a pilot controls all of or some of the electric motors in the electric pedal control device to output in different pre-set modes, so as to balance the force senses, for example, for the above-mentioned quad-redundant electric pedal control device, all of the four electric motors may be directly controlled by means of the balancing switch.

Furthermore, it is also possible to receive a control instruction provided by a terminal of an automatic flight computer to directly control any one of the electric motors to move same forward or backward, and the force sense balancing pilot controls the position and the force sense of any one of the electric motors by means of the pedal to effect a follow-up function.

According to another preferred embodiment of the present invention, when the rotational position information received by the controller indicates that the rotational acceleration of at least one of the pedals around the pedal revolute pair exceeds a pre-set rotational acceleration threshold, the controller rejects to directly control the operation of the electric motors according to the input control instruction. Therefore, an override function of the electric pedal control device can be effected. That is to say, the pilot can pedal hard to enable the RVDT sensor to generate a sufficiently strong current signal, and the controller disconnects, according to this current signal, the access for controlling the electric motor according to the control instruction control, so as to only effect the dampening function but not to effect the position control.

Compared with the conventional distributed and centralized layouts, the above-mentioned preferred embodiments of the present invention reduce the volume and weight of the entire electric pedal control device, thereby helping to increase the dispatch rate.

While the particular embodiments of the present invention have been described above, a person skilled in the art should understand that these are merely illustrative, and that the scope of protection of the present invention is defined by the appended claims. Various alterations or modifications to these embodiments can be made by a person skilled in the art without departing from the principle and essence of the present invention; however, these alterations and modifications all fall within the scope of protection of the present invention.

The invention claimed is:

1. An electric pedal control device for an aircraft, comprising:
    several pedal transmission assemblies, each of the pedal transmission assemblies including an electric motor, an elastic connector, a transmission mechanism, an angular displacement sensor, and a pedal, wherein:
    the elastic connector connects an output shaft of the electric motor and one end of the transmission mechanism, the other end of the transmission mechanism is connected to the pedal via a pedal revolute pair, the angular displacement sensor is configured to acquire rotational position information about the pedal around the pedal revolute pair, and the transmission mechanism is provided with a transmission mechanism revolute pair;
    the transmission mechanism revolute pairs of the transmission mechanisms in the pedal transmission assemblies are connected via a mechanical connecting rod mechanism to effect linkage; and
    the electric pedal control device further comprises a controller, which is configured to receive the rotational position information acquired by the angular displacement sensors, and to control, according to the rotational position information, the electric motors to dampen the elastic connectors.

2. The electric pedal control device as claimed in claim 1, wherein the controller is further configured to receive an input control instruction, and to directly control the operation of the electric motors according to the input control instruction.

3. The electric pedal control device as claimed in claim 2, wherein the controller is configured to directly control all of or some of the electric motors to balance elastic forces of the elastic connectors.

4. The electric pedal control device as claimed in claim 2, wherein the controller is configured to halt control operation of the electric motors according to the input control instruction when the rotational position information received by the controller indicates that a rotational acceleration of at least one of the pedals around the pedal revolute pair exceeds a predetermined rotational acceleration threshold.

5. The electric pedal control device as claimed in claim 1, wherein the output shaft of the electric motor is connected to the elastic connector via a torque limiter.

6. The electric pedal control device as claimed in claim 1, wherein the elastic connector is a spring.

7. The electric pedal control device as claimed in claim 1, wherein the electric pedal control device further includes an output interface, which is configured to transmit the rotational position information to a flight control computer of the aircraft.

8. An electric pedal control device for an aircraft, comprising:
    several pedal transmission assemblies, each of the several pedal transmission assemblies including an electric motor, an elastic connector, an angular displacement sensor, and a corresponding pedal,
    wherein the several pedal transmission assemblies are configured as two left pedal transmission assemblies and two right pedal transmission assemblies,
    wherein the two left pedal transmission assemblies share a first transmission mechanism revolute pair, and the two right pedal transmission assemblies share a second transmission mechanism revolute pair,
    wherein, in each of the two left pedal transmission assemblies, one end of the elastic connector is connected to the output shaft of the electric motor and the other end thereof is connected to the first transmission mechanism revolute pair via a connecting rod, and the corresponding pedal is connected via a transmission component to the first transmission mechanism revolute pair,
    wherein, in each of the two right pedal transmission assemblies, one end of the elastic connector is connected to the output shaft of the electric motor and the other end thereof is connected to the second transmission mechanism revolute pair via a connecting rod, and the corresponding pedal is connected via a transmission component to the second transmission mechanism revolute pair, and
    wherein the first transmission mechanism revolute pair and the second transmission mechanism revolute pair are connected via a mechanical connecting rod mechanism to effect linkage.

\* \* \* \* \*